INVENTOR.
MAURICE SEIDERMAN

By Herzig, Walsh & Blackham
ATTORNEYS.

United States Patent Office 3,503,942
Patented Mar. 31, 1970

3,503,942
HYDROPHILIC PLASTIC CONTACT LENS
Maurice Seiderman, 3306 Deronda Drive,
Los Angeles, Calif. 90028
Filed Oct. 23, 1965, Ser. No. 503,636
Int. Cl. C08f 15/40
U.S. Cl. 260—80.75                      8 Claims

ABSTRACT OF THE DISCLOSURE

A hydrophilic polymer of from about 50 to about 95% by weight of an hydroxyalkyl acrylate or methacrylate, a minor amount up to about 35% by weight of an alkyl acrylate or methacrylate and from about 1 to about 50% by weight of a cross-linking monomer and a contact lens formed therefrom.

---

This invention relates to contact lenses and resins or plastic materials having hydrophilic characteristics, controlled amounts of cross-linked polymeric structures and other desirable properties for the manufacture therefrom of contact lenses.

Hydrophilic plastic materials have been described for use in making contact lenses. For example, United States Patent No. 2,976,576, issued to Wichterle et al. on Mar. 28, 1961, describes a process for producing certain three dimensional hydrophilic polymers in aqueous reaction media having a sparingly cross-linked polymeric hydrogel structure and having the appearance of elastic, soft, transparent hydrogels. Preferred reactants, or starting materials for producing the hydrogels, according to the method of the patent, include hydroxy methacrylates which contain hydrophilic groups with such an affinity for water and water-dilutable solvents, that the original solubility of the monomers results in sufficient affinity of the polymeric network to water to produce the desired hydrogels.

It has been found that contact lenses produced from hydrogels, such as those produced in accordance with the method of the hereinabove-noted patent, having a jelly-like, soft, elastic consistency, are very difficult to apply to, and remove from the eyes. To remove such contact lenses from the eye, it is necessary to grasp the lens firmly between the thumb and forefinger and to remove it from the eyeball by force. This operation occasionally results in scratching the epithelium and the production of abrasions endangering one's eyesight by opening avenues of eye infections by dangerous bacteria.

Furthermore, such prior art types of contact lenses do not ride on the cornea of the eye on a layer of tears, as is desirable, but attach themselves very closely to the epithelium of the cornea in a manner to undesirably reduce the metabolic outflow of the fluid or aqueous humor from the anterior chamber of the eye. In conventional, present day contact lenses made of hard hydrophobic resins or plastics, instead of glass, these generally is better circulation of fluids beneath the contact lens than there is in a soft, elastic, jelly-like lens, whether it is hydrophilic or not. Furthermore, the permeability of the cornea of the eye is greater by a very large factor than that of the above-described hydrogel contact lenses. In addition, such prior art hydrogel, jelly-like contact lenses are cast or molded and are not capable of being made on standard contact lens manufacturing equipment presently being used to manufacture hard plastic contact lenses. Many hundreds of contact lens producers presently have millions of dollars invested in such contact lens manufacturing equipment.

Accordingly, it is an important object of this invention to provide a hydrophilic plastic or resin contact lens material having the desired balance of properties of hardness and rigidity which will permit the use of existing conventional production methods and fabricating equipment in use for hard plastics or resins for such operations as cutting and polishing, for example.

Another important object of this invention is to provide a contact lens of hydrophilic plastic or resin material which safely and conveniently can be applied to the eyes, which will ride on the cornea of the eye on a layer of tears, and have some degree of permeability, and which can safely and conveniently be removed from the eyes by the use of well established procedures.

Additional objects of the invention will become apparent from the following description, which is given primarily for purposes of illustration, and not limitation.

Stated in general terms, the objects of the invention are attained by providing a hydrophilic contact lens having the desirable properties of hydrophobic contact lenses; but none of their undesirable properties, such as resistance to the adhesion of tears to the degree that a wetting solution is needed during use of the contact lens on the eye; and having the desirable properties of good surface workability for the production of very good optics in the hydrophilic contact lens. It has been discovered that by introducing a controlled, increased amount of cross-linking into the polymeric structure of the hydrophilic plastic or resin, rather than the sparing amount of cross-linking described in the hereinabove referenced U.S. Patent No. 2,976,576, for example, hydrophilic plastic materials are produced which are in a substantially permanently hydrated state, are stiff rather than soft, are flexible and retain their structure and shape throughout the process of cutting, polishing and finishing the contact lens produced therefrom by cutting and polishing in accordance with standard methods.

It also has been found that the hydrophilic plastic materials of this invention preferably are produced from reactants to which water has not been added as a solvent, and in a reaction mixture to which water has not been added as a solvent, or for the purpose of producing an aqueous reaction mixture. The preferred polymeric materials of this invention absorb from about 5 to about 38 percent by weight, or volume, of water based upon the total hydrated resin or plastic composition, can be cut and polished to an optical finish while in this equilibrium, stable hydrated state, and remain hydrophilic throughout.

The process of producing these hydrated plastic materials can be described as the controlled free radical initiated mass polymerization of hydroxyalkyl acrylate and methacrylate esters in co-polymeric composition with minor amounts of a longer chain alkyl acrylate or methacrylate ester co-monomer and a cross-linking co-monomer such as allyl diglycol carbonate, glycol diacrylates, glycol dimethacrylates, polyglycol diacrylates and dimethacrylates, allyl methacrylates, triallyl cyanurate and others familiar to those skilled in the art. The process and combination of reactants are chosen to produce a stiff, flexible, water insoluble, synthetic organic polymeric structure which is formulated to exhibit optimum water wetting characteristics in the polymer plastic, or resinous product with a minimum of water swelling properties and a minimum tendency to change the optics of a contact lens fabricated from the plastic polymeric product.

A controlled amount of cross-linking of the main backbone of hydroxyalkylmethacrylate polymer is achieved to obtain an optical grade, cast polymer which can be polished into a contact lens shape while totally hydrated, which exhibits the property of autowettability when in position in contact with the eye, and also exhibits the other desired physical characteristics described hereinabove. The addition of the longer chain alkyl methacrylate to the reactant mixture as a co-monomer is designed to achieve better polymer chain strength, as well as to aid in restricting water swellability of the hydrophilic polymeric network produced in the polymeric product.

The following examples are given to illustrate the production of the hydratable hydrophilic plastic materials of the invention, which have been satisfactorily used to produce contact lenses of the invention:

EXAMPLE I

The following acid and inhibitor-free monomers were thoroughly mixed in the quantities indicated:

| | G. |
|---|---|
| Hydroxypropyl methacrylate | 425 |
| 1,3-butylene glycol dimethacrylate | 20 |
| Lauryl methacrylate | 17 |
| Polyethylene glycol dimethacrylate | 54 |
| Allyl diglycol carbonate containing 3% benzoyl peroxide catalyst | 23 |

After the components were carefuly mixed and filtered, the batch was deaerated by evacuation to low pressure and was then blanketed with an inert gas prior to pouring into a suitable glass mold for casting to an optically clear solid polymer. Since these polymer mixes tend to adhere quite strongly to glass, suitable release techniques are generally used based on procedures well known to those trained in the casting art.

The polymer obtained from the above mix, which had been cured in a water bath at 140° F. for 10 hours and 170° F. for 2 hours, proved to be sufficiently hydrophilic and stiff so that it could be easily machined, polished with wet polishing aids and subsequently extracted and sterilized in boiling water prior to its use in optical applications.

EXAMPLE II

A mixture of inhibitor-free monomers similar to those described in Example I were combined as follows:

| | G. |
|---|---|
| Hydroxypropyl methacrylate | 80 |
| Lauryl methacrylate | 5 |
| Polyethylene glycol dimethacrylate | 15 |
| Benzoyl peroxide | 0.5 |

The mix was deaerated, poured into cells and cast at 135° F. for 12 hours. It was postcured at 170° F. for 1 hour. This formulation was more flexible and resilient than that produced in Example I.

EXAMPLE III

The following formulation was treated as described in Examples I and II.

| | G. |
|---|---|
| Hydroxypropyl methacrylate | 100 |
| Tetraethylene glycol dimethacrylate | 25 |
| Butylmethacrylate | 15 |
| Benzoyl peroxide | 0.2 |

The mix was cast at 140° F. for 12 hours and postcured for 1 hour at 170° F.

Although it is preferred to use from about 75 to about 95% by weight hydroxyalkylmethacrylate in the reaction mixture, amounts outside this range such as down to 50% also have been used successfully. The amounts of the longer chain alkyl methacrylate can vary up to 35% by weight or volume of the co-polymer mixture composition for best results, and the cross-linking agents can be used in amounts varying from 1% to 50% by weight or volume in the reaction mixture.

Examples of suitable hydroxyalkyl methacrylates are: 2-hydroxyethyl methacrylate, 2-hydroxypropyl methacrylate, and the like. Other hydroxyalkyl methacrylates can be used with varying degrees of satisfaction. Also, alkylamino alkyl methacrylates, such as 2-dimethylaminoethyl methacrylate, 2-butylaminoethyl methacrylate, and the like, can be used with differing degrees of satisfaction, instead of, in admixture with the hydroxyalkyl methacrylates.

Examples of suitable alkyl methacrylates are: methyl methacrylate, ethyl methacrylate, propyl methacrylate, butyl methacrylate, and the like, showing varying degrees of satisfaction.

Examples of suitable longer chain alkyl methacrylates are: lauryl methacrylate, or other alkyl methacrylates wherein the alkyl radical thereof contains from about 5 to about 20 carbon atoms in the alkyl chain, such as capryl, palmityl, stearyl, cyclohexyl methacrylates, and alkyl cyclohexyl, and cyclo-octyl and cyclo-dodecyl methacrylates.

Examples of suitable cross-linking agents are: olefin glycol dimethacrylates such as: ethylene glycol dimethacrylate, diethylene glycol dimethacrylate, triethylene glycol dimethacrylate, tetraethylene glycol dimethacrylate, polyethylene glycol dimethacrylate, 1, 4-butylene glycol dimethacrylate and 1, 3-butylene glycol dimethacrylate.

Allyl diglycol carbonate and triallylcyanurate, etc., also can be used as cross-linking agents.

Examples of suitable catalysts are: benzoyl peroxide, chlorobenzoyl peroxide, lauryl peroxide, tertiary butyl peroxy carbonate, isopropyl peroctoate, etc. and many other organic peroxides that are soluble in one of the monomers or in all of the monomers employed in the reaction mixture with varying degrees of success.

The production of the hydrophilic contact lens of the invention is described with reference to the appended drawing, wherein.

In the dehydrated state the hydratable hydrophilic polymers of the invention have a very high refractive index of about 1.53 and when thoroughly hydrated the refractive index is about 1.44. The raw, dehydrated polymers, as produced in the polymerization reaction, are brittle when in the hydratable, reaction product form. They are cut to appropriate sizes and placed in a container of water for storage until ready for use. If the polymers have not been in water for a sufficient length of time to reach the equilibrium stage of water absorption, they are first cut to an approximate curve required for the contact lens 10 and again placed in water. To speed the attainment of equilibrium hydration of from about 5 to about 38 percent water, by weight or by volume, the water is heated, such as boiled, until equilibrium hydration is attained. About 2 hours of boiling is sufficient. After boiling, the water is permitted to cool to room temperature.

Figure 1:
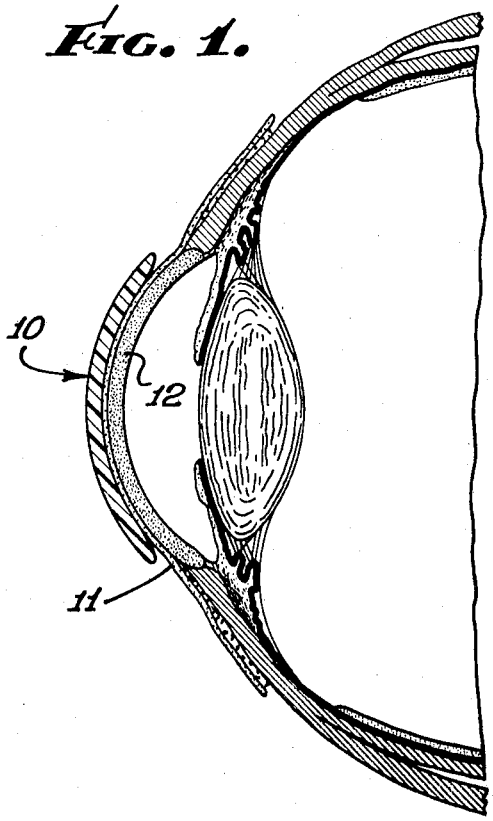
FIG. 1 is an enlarged vertical sectional view showing a contact lens, made according to the invention applied to a human eye.
Figure 2:
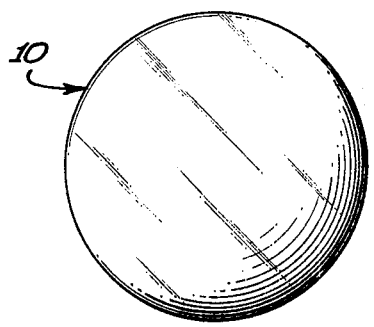
FIG. 2 is a front elevational view showing the contact lens illustrated in FIG. 1.
Figure 3:
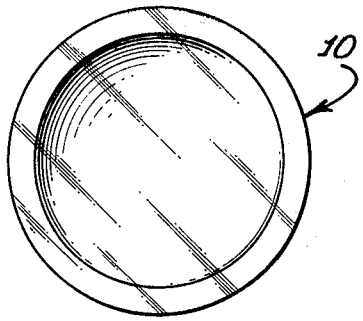
FIG. 3 is a rear elevational view, also showing the contact lens of FIG. 7.

After the cut polymer, or polymer blanks have been equilibrium hydrated in this manner, the blanks are mounted on mandrels, usually held in collets, and cut and polished to the final finish, as shown, for example, in FIGS. 1 to 3. Care should be taken not to unduly squeeze or pressure the flexible, hydrated polymer blank. It is suggested that an approximate R–2 curve be cut first before cutting the final R–2 curve and polishing. The shape with the approximate R–2 curve is placed in boiling water for a sufficient time to insure that the cut surface is thoroughly hydrated. The final R–2 surface then is cut and provided with a finishing polish.

The same polish, polishing equipment and polishing speeds used conventionally can be employed, care being taken that the surface being polished is not permitted to dry. The blanks provided with the finished R–2 curves are placed in water and kept in water until the front curve is cut. In cutting the front curve, cement is used, as is conventional, to cement the R–2 surface onto a matching mandrel. After the front curve is cut and finished, the lens is removed from the mandrel by dipping the end of the mandrel into boiling water to soak loose the lens. Organic solvents should not be used to remove the cement.

A small basket can be used to suspend the separated lens in boiling water. The lens should not be permitted to rest on the bottom of the container of water. The lens is extracted with clean boiling water to remove all foreign particles or any foreign matter adhering thereto.

If the lens has become distorted for any reason, it is again placed in boiling water in a small basket and permitted to cool to room temperature before it is removed from the water. It will be found that this treatment generally removes the distortion. The resulting hydrated, cut and polished lens is cleaned with conventional lens cleaning solutions, which generally also serves as wetting agents. These cleansing and wetting preparations usually are harmless to the human eye and do not have to be thoroughly removed from the resulting contact lens before it is placed into the eye.

After the resulting contact lens 10 has been placed onto the eye, it behaves very much as do prior art hydrophobic contact lenses, with the exception that it does not require the continual use of wetting solutions which are fugitive, and disappear after a short time. Unlike the newer, patented hydrophilic gel lenses mentioned hereinabove, the permeability of the plastic polymer employed in the lens of the instant invention is controlled by cross-linking and polymerization methods hereinabove described, and does not preclude the use of fluorescein to evaluate the fit of the contact lens in its relation to the eye. Furthermore, the lens of the invention is permeable to aqueous fluids so that the corneal fluids slowly diffuse through the lens material from the eye.

Contact lenses are designed in many shapes by manufacturers, based upon well established prior art methods. These prior art methods generally are directed to the production of contact lenses 10 having somewhat receding curvatures as the edge of the lens extends closer to the limbal area 11 of the cornea 12. The human cornea 12 is not entirely spherical. Only a small, centrally located portion of the cornea 12 can be considered to be a spherical body. This small spherical corneal portion varies from person to person, but a one-sixth millimeter surface area can be considered to be average.

The surface area of the average human cornea 12 is from about 9 to about 11 mm. The balance of the corneal area gradually, without steps, flattens uniformly until the limbal area 11 is reached. This flattening curvature gives the cornea 12 the shape of a parabola combined with a spherical area at the apex thereof, rather than a sphere.

To conform to the physiological shape of the cornea, the manufacture of contact lenses 10 grinds down, or cuts away, some additional material near the periphery of the inside of the lens; called secondary curve and periphery curve. These additional curves have longer radii than that of the spherical curve of the contact lens. These curves are blended together by polishing and do not gradually flatten out, as does the human cornea 12, but they make a close approximation to it. The hydratable, hydrophilic polymer of the instant invention can be treated in the same manner.

Obviously many other modifications and variations of the present hydrophilic plastic materials and contact lenses, prepared therefrom, are possible in the light of the teachings given hereinabove. It is, therefore, to be understood that, within the scope of the appended claims, the invention can be practiced otherwise than as specifically described.

What is claimed is:

1. A contact lens comprising a hydrated, hydrophilic polymer having a water absorption equilibrium not less than 5% and not more than 38% by weight and consisting essentially of from about 50 to about 95% by weight of an hydroxyalkyl acrylate or methacrylate, a minor amount up to about 35% by weight of alkyl acrylate or methacrylate wherein the alkyl group contains from 1 to about 20 carbon atoms and from about 1 to about 50% by weight of a cross-linking monomer.

2. A contact lens comprising a hydrated, hydrophilic polymer having a water absorption equilibrium not less than 5% and not more than 38% by weight and consisting essentially of from about 50 to about 95% by weight of hydroxypropyl methacrylate, a minor amount up to about 35% by weight of lauryl methacrylate and from about 1 to about 50% by weight of a cross-linking monomer.

3. A contact lens comprising a hydrated, hydrophilic polymer having a water absorption equilibrium not less than 5% and not more than 38% by weight and consisting essentially of from about 50 to about 95% by weight of an hydroxyalkyl acrylate or methacrylate, a minor amount up to about 35% by weight of alkyl acrylate or methacrylate wherein the alkyl group contains from about 5 to about 20 carbon atoms and from about 1 to about 50% by weight of a cross-linking monomer.

4. A contact lens comprising a hydrated, hydrophilic polymer having a water absorption equilibrium not less than 5% and not more than 38% by weight and consisting essentially of from about 50 to about 95% by weight of hydroxypropyl methacrylate, a minor amount up to about 35% by weight of an alkyl acrylate or methacrylate wherein the alkyl group contains from 1 to about 20 carbon atoms and from about 1 to about 50% by weight of a cross-linking monomer.

5. A contact lens comprising a hydrated, hydrophilic polymer having a water absorption equilibrium not less than 5% and not more than 38% by weight and consisting essentially of from about 50 to about 95% by weight of hydroxypropyl methacrylate, a minor amount up to about 35% by weight of lauryl methacrylate, and from about 1 to about 50% by weight of polyethylene glycol dimethacrylate.

6. A hydrophilic polymer which will absorb from about 5 to about 38% by weight water based on the total hydrated polymer composition consisting essentially of from about 50 to about 95% by weight of an hydroxyalkyl acrylate or methacrylate, a minor amount up to about 35% by weight of an alkyl acrylate or methacrylate wherein the alkyl group contains from 1 to about 20 carbon atoms and from about 1 to about 50% by weight of a cross-linking monomer.

7. A hydrophilic polymer which will absorb from about 5 to about 38% by weight water based on the total hydrated polymer composition consisting essentially of from about 50 to about 95% by weight of hydroxypropyl methacrylate, a minor amount up to about 35% by weight of lauryl methacrylate and from about 1 to about 50% by weight of a cross-linking monomer.

8. A hydrophilic polymer which will absorb from about 5 to about 38% by weight water based on the total hydrated polymer composition consisting essentially of from about 50 to about 95% by weight of an hydroxyalkyl acrylate or methacrylate, a minor amount up to about 35% by weight of an alkyl acrylate or methacrylate wherein the alkyl group contains from 1 to about 20 carbon atoms and from about 1 to about 50% by weight of polyethylene glycol dimethacrylate.

References Cited

UNITED STATES PATENTS

| | | | |
|---|---|---|---|
| 2,976,576 | 3/1961 | Wichterle et al. | 351—160 X |
| 3,361,696 | 1/1968 | Bolgiano et al. | 260—80.75 X |
| 3,361,858 | 1/1968 | Wichterle | 351—160 X |

JOSEPH L. SCHOFER, Primary Examiner

S. M. LEVIN, Assistant Examiner

U.S. Cl. X.R.

260—77.5; 351—160, 177